July 19, 1932.  P. J. THOMAS  1,868,438
AUTOMATIC BELT TAKE-UP
Filed April 11, 1930  2 Sheets-Sheet 1
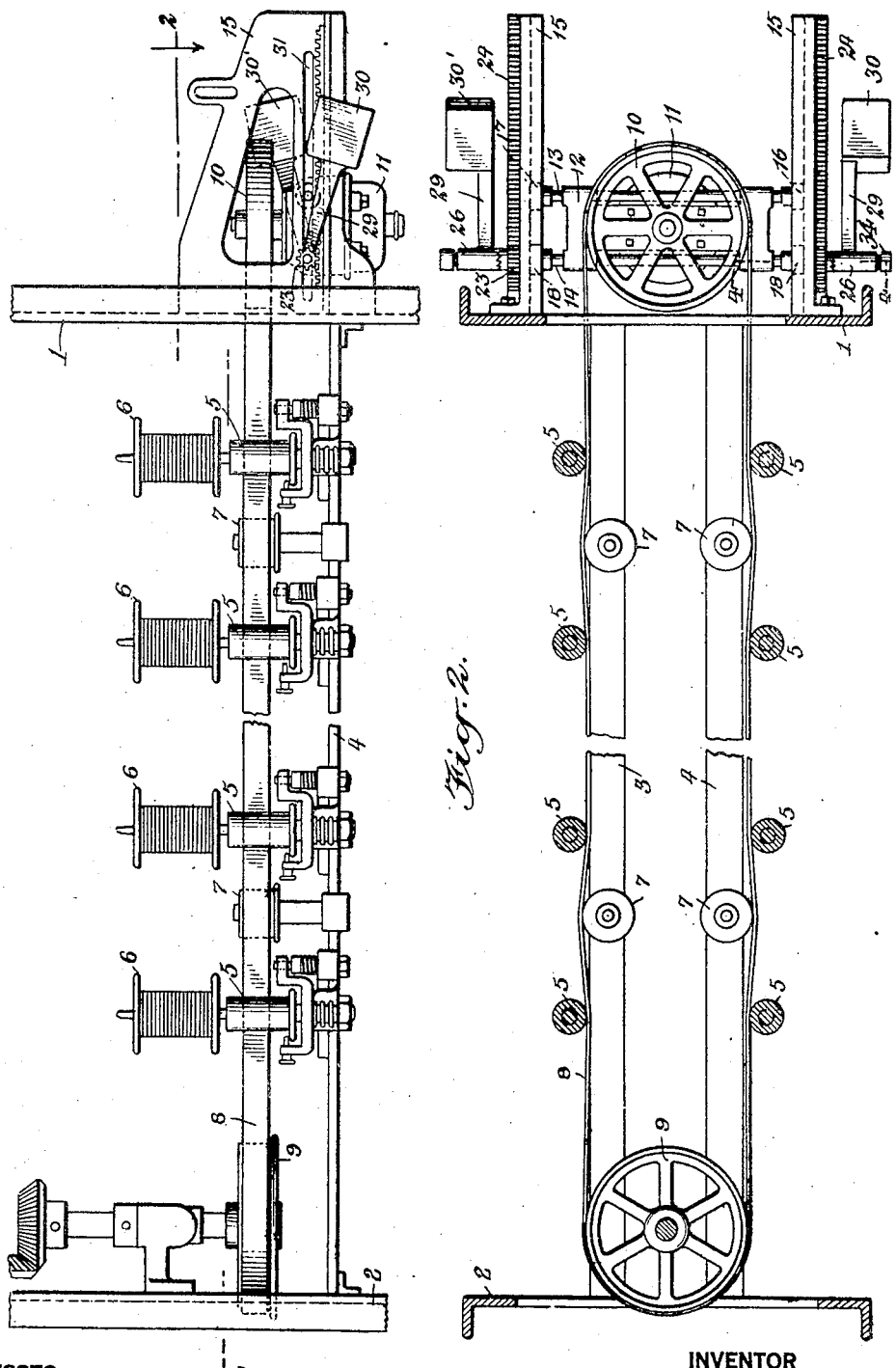
WITNESSES
INVENTOR
Pacific J. Thomas
BY
ATTORNEYS July 19, 1932.   P. J. THOMAS   1,868,438
AUTOMATIC BELT TAKE-UP
Filed April 11, 1930   2 Sheets-Sheet 2

WITNESSES

INVENTOR
Pacific J. Thomas
BY
ATTORNEYS

Patented July 19, 1932

1,868,438

UNITED STATES PATENT OFFICE

PACIFIC J. THOMAS, OF WYOMING, PENNSYLVANIA, ASSIGNOR TO U. S. TEXTILE MACHINE COMPANY, OF SCRANTON, PENNSYLVANIA, A CORPORATION OF PENNSYLVANIA

AUTOMATIC BELT TAKE-UP

Application filed April 11, 1930. Serial No. 443,545.

This invention relates to an automatic belt take-up, the object being to provide an improved construction wherein all slack may be automatically taken up continuously.

Another object of the invention is to provide a belt tightener for twisting machines and other machines wherein the motor used in driving the belt is slidingly mounted and is associated with weighted members acting substantially to move the motor in one direction.

A further object of the invention is to provide a belt tightener for twisting machines wherein the driving pulley is connected directly with a sliding motor, and the sliding motor in turn is connected with an automatic weight actuated means for moving the motor and pulley for causing a proper tension of the belt passing over the pulley.

In the accompanying drawings:—

Figure 1 is a fragmentary side view showing part of a twisting machine and an embodiment of the invention applied thereto;

Figure 2 is a sectional view through Figure 1 approximately on the line 2—2;

Figure 3:
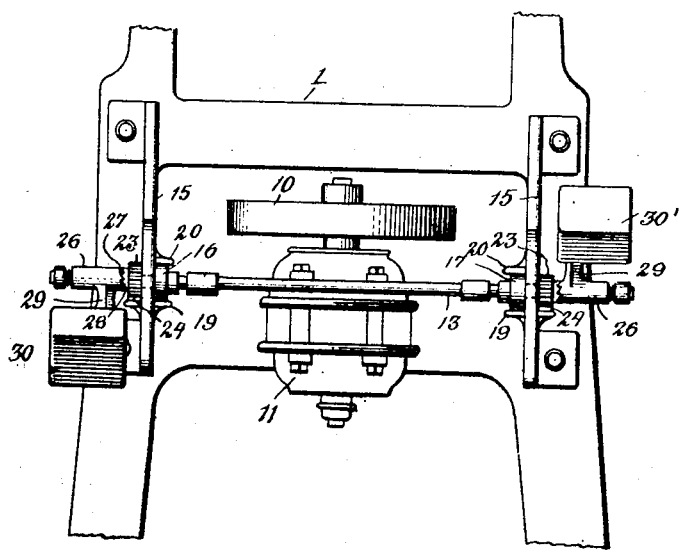
Figure 3 is an end view on a large scale of the belt tightener and associated parts shown in Figure 1.

Referring to the accompanying drawings by numerals, 1 and 2 indicate the end members, and 3 and 4 connecting bars forming a frame for a twisting machine. Mounted on this frame is a suitable whorl 5 forming the twisting mechanism. The whorl 5 includes bobbins 6 and idler pulleys 7 associated therewith and adapted to be operated by the belt 8. The belt 8 at one end passes over the fixed pulley 9 and over the sliding or adjustable pulley 10 at the opposite end. The pulley 9 is connected through a shaft to certain moving parts of the twisting machine which form no part of the present invention.

The pulley 10 is connected directly with the electric motor 11 so as to be driven thereby. The motor 11 is bolted or otherwise rigidly secured to the plate 12 mounted on rods 13 and 14. These three members form a reciprocating frame carried by the bracket 15. Motor 11 may be of any desired type of the proper horse power to drive pulley 10 when the belt 8 is at the desired tightness.

Figure 4:
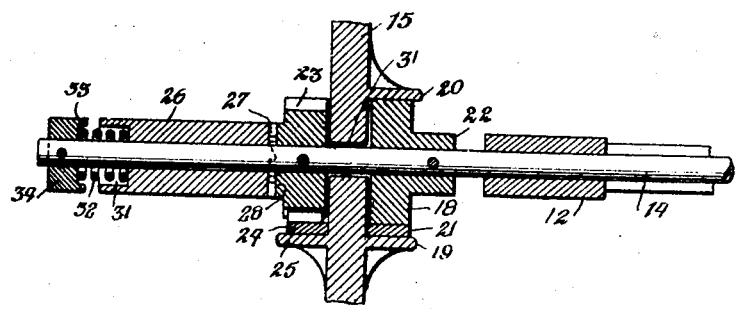
Figure 4 is an enlarged fragmentary sectional view through Figure 3 on the line 4—4.

Shaft 13 carries rollers 16 and 17, while shaft 14 carries rollers 18 and in addition carries certain members hereinafter fully described. The rollers 16 and 18 are associated with the bracket 15 and operated between the shoulders 19 and 20, as shown in Figure 4. In fact, the weight of these rollers and the parts carried thereby rest on the auxiliary track 21 carried by the shoulder 19.

A similar structure is provided on the opposite side of the machine with respect to rollers 17 and 18. As both sides of the machine are identical the description of one will apply to both.

As shown in Figure 4 the rod or shaft 14 carries a roller 18. This roller is formed with a hub 22 pinned securely to shaft 14, said hub acting as a thrust bearing for limiting the sliding movement of plate 12 on shaft 14. The shaft 14 extends not only through roller 18 and its hub but through the slot 31 in bracket 15. The small pinion 23 is securely pinned to rod 14 and meshes continuously with the rack 24 rigidly secured to the shoulder 25, which shoulder is preferably cast integral with bracket 15.

The sleeve 26 is also loosely mounted on the shaft or rod 14, said sleeve having clutch teeth 28 coacting with teeth 27 formed on pinion 23. The sleeve 26 is preferably cast integral with the arm 29 which carries a weight 30 at the upper end. This weight may be integral with the arm 29 or may be made separately and rigidly secured thereto, or adjustably secured as desired.

As shown in Figure 4, sleeve 26 is provided with a socket 31 carrying a spring 32, said spring having one end resting in the socket 33 of block 34 pinned or otherwise rigidly secured to shaft or rod 14.

The weights 30 and 30' may operate in unison or they may operate at different times. Preferably one is raised to a comparatively high point, as shown by weight 30' in Figure 1, while the other weight 30 is at a lower point, thus permitting weight 30' to continue to function after weight 30 has been moved downwardly until arm 29 is vertical. In this way a continuous tension is secured and the slack in the belt is automatically taken up.

In case it should be desired to cause either weight to function again, it is only necessary to raise the weight and in doing so the teeth 27 will slip by teeth 28, as spring 32 will allow sleeve 26 to yield. After the upward swinging movement of either of the weights has been completed, spring 32 will function and cause the clutch members or teeth 27 and 28 to interlock thus permitting strain on the gear 23 and other associated parts.

It will be noted that by reason of the respective wheels carried by the rods 13 and 14 the carriage supporting pulley 10 is held against any upward or downward movement as these rollers operate between the auxiliary brackets 19 and 20. In this way the pulley 10 is kept in the correct vertical position, although it may be moved back and forth horizontally.

By the arrangement of gears and racks together with the weighted arms and associated parts, not only is belt 8 kept under the proper and desired tension at all times, but the stretch in the belt is taken up as the travel of the pulley 10 is appreciable. As shown in Figure 1 each of the brackets 15 is provided with a slot 31 and through these slots the rod 14 extends. The pulley wheel 10 and associated parts may move a distance substantially equal to the length of the slot 31. It will thus be seen that the stretch of the belt is taken care of by the length of the slot 31 in bracket 15, and if this should not be sufficient a simple shortening of the belt is all that is required.

It will be understood that the belt tension or take-up of the device may be used with a single twisting machine or with a multiple deck twister without departing from the spirit of the invention. This is particularly true because each device operates independently and in connection only with one belt.

By the use of weights instead of springs there is no diminution of power as the frame carrying pulley 10 moves. Naturally the weights 30 and 30' will have less strain or pulling power as they move to a point nearer the vertical, and when it is found that there is not enough tension one or both of these weights may be raised to a horizontal position or to some other position to secure the desired pull. It will be further noted that the take-up or tension is automatic and continuous.

I claim:

1. A belt tightener including a pulley, a driving member connected to said pulley, reciprocating supporting means for supporting said driving member, a stationary rack, a gear rotatably mounted on said supporting means, said gear meshing with said rack, said gear having clutch teeth on one face, a sleeve having clutch teeth at one end, a spring acting on said sleeve for normally holding the teeth of the sleeve in engagement with the teeth of said gear, and a weighted arm rigidly connected with said sleeve for giving the sleeve a tendency to rotate.

2. A belt tightener comprising a pair of brackets adapted to be rigidly secured to the frame of the machine to which the tightener is connected, each bracket having a slot extending in a horizontal direction, a carriage supported by said brackets, said carriage including a rod extending through the slots of said bracket, a motor carried by said carriage, a pulley connected with said motor and supported thereby, a pinion for each bracket rotatably mounted on said rod, a rack carried by each bracket, said racks meshing with the respective pinions, each of said pinions having clutch teeth on one face, a sleeve rotatably mounted on said rod adjacent each of said pinions, each of said sleeves having clutch teeth at one end, a spring acting on each of said sleeves for normally holding the clutch teeth thereof in engagement with the clutch teeth of the respective pinions, and a weighted arm extending from each of said sleeves whereby either sleeve may be brought under tension for rotating the pinion adjacent thereto.

PACIFIC J. THOMAS.